(12) United States Patent
Park et al.

(10) Patent No.: US 9,321,940 B2
(45) Date of Patent: Apr. 26, 2016

(54) DECORATIVE SHEET FOR DECORATING A SURFACE OF A THREE-DIMENSIONAL MOLDED MATERIAL, METHOD FOR MANUFACTURING THE SAME, AND METHOD FOR DECORATING THE SURFACE OF THE MOLDED MATERIAL USING THE SAME

(75) Inventors: Ji-Yong Park, Ulsan (KR); Moon-Ki Yea, Ulsan (KR); Jung-Eun Ha, Changwon-si (KR)

(73) Assignee: LG HAUSYS, LTD., Seoul (KR)

( * ) Notice: Subject to any disclaimer, the term of this patent is extended or adjusted under 35 U.S.C. 154(b) by 28 days.

(21) Appl. No.: 13/995,873

(22) PCT Filed: Nov. 21, 2011

(86) PCT No.: PCT/KR2011/008858
§ 371 (c)(1),
(2), (4) Date: Jun. 19, 2013

(87) PCT Pub. No.: WO2012/096437
PCT Pub. Date: Jul. 19, 2012

(65) Prior Publication Data
US 2013/0269872 A1    Oct. 17, 2013

(30) Foreign Application Priority Data
Jan. 13, 2011    (KR) .................. 10-2011-0003678

(51) Int. Cl.
*B29C 65/52*    (2006.01)
*B32B 37/02*    (2006.01)
(Continued)

(52) U.S. Cl.
CPC ............... *C09J 7/0264* (2013.01); *B44C 1/105* (2013.01); *B44C 1/1729* (2013.01); *Y10T 428/1476* (2015.01)

(58) Field of Classification Search
CPC ....... C09J 7/0246; C09J 7/0264; B44C 1/105; B44C 1/1729; B44C 1/1733; B44C 3/08; B44C 3/087; C09F 3/02; C09F 3/10; B32B 7/06; B32B 15/08; B32B 27/00; B32B 37/12; B32B 37/1253; B32B 38/14; B41M 7/0027
USPC .......................... 156/247, 249, 277, 278, 289
See application file for complete search history.

(56) References Cited

U.S. PATENT DOCUMENTS 7,939,163 B2 *   5/2011   Pierson et al. ................ 428/212
2002/0029713 A1   3/2002   Morizumi et al.
(Continued)

FOREIGN PATENT DOCUMENTS

JP         06166299         6/1994
JP      2001038849 A        2/2001
(Continued)

OTHER PUBLICATIONS
Machine Translation of JP 2001-199013 (Oct. 1, 2014).*
(Continued)

*Primary Examiner* — Sing P Chan
(74) *Attorney, Agent, or Firm* — Hauptman Ham, LLP

(57) ABSTRACT

The present invention relates to a decorative sheet for decorating a surface of a three-dimensional molded material, a method for manufacturing same, and a method for decorating the surface of the molded material using same. The method for manufacturing the decorative sheet includes: a printed sheet preparation step of preparing a printed sheet including a base layer and a surface treatment layer; an boding step of preparing an adhesive layer containing an adhesive and a release film layer by applying the adhesive onto a release film to be layered onto a back side of the adhesive layer, and laminating the printed sheet on a surface of the adhesive layer being bonded; and a drying-solidifying step in which the adhesive layer is changed from a liquid state into a solid state.

4 Claims, 5 Drawing Sheets

(51) Int. Cl.
   *B32B 37/12* (2006.01)
   *B32B 37/28* (2006.01)
   *B32B 38/10* (2006.01)
   *B32B 38/12* (2006.01)
   *B32B 38/14* (2006.01)
   *C09J 7/02* (2006.01)
   *B44C 1/17* (2006.01)
   *B44C 1/10* (2006.01)

(56) References Cited

U.S. PATENT DOCUMENTS

2002/0164490 A1* 11/2002 Tadokoro et al. ............. 428/515
2003/0041962 A1* 3/2003 Johnson et al. ............... 156/266

FOREIGN PATENT DOCUMENTS

| JP | 2001199013 A * | 7/2001 |
| JP | 2002264592 | 9/2002 |
| JP | 2004142107 A | 5/2004 |
| JP | 2007136796 | 6/2007 |
| JP | 2008149552 A | 7/2008 |
| JP | 2010149485 A | 7/2010 |
| KR | 1020090128054 | 12/2009 |

OTHER PUBLICATIONS

Machine Translation of JP 2010-149485.*
Japanese Office Action dated Jun. 5, 2014.
International Search Report mailed May 23, 2012 for PCT/KR2011/008858.

* cited by examiner (a)

(b)

(c)

DECORATIVE SHEET FOR DECORATING A SURFACE OF A THREE-DIMENSIONAL MOLDED MATERIAL, METHOD FOR MANUFACTURING THE SAME, AND METHOD FOR DECORATING THE SURFACE OF THE MOLDED MATERIAL USING THE SAME

CROSS REFERENCE TO RELATED APPLICATION

This application claims the priority of Korean Patent Application No. 10-2011-0003678, filed on Jan. 13, 2011 in the KIPO (Korean Intellectual Property Office). Further, this application is the National Phase application of International Application No. PCT/KR2011/008858 filed on Nov. 21, 2011, which designates the United States and was published in Korean.

TECHNICAL FIELD

The present invention relates to a decorative sheet for decorating a surface of a three-dimensional molded material, a method for manufacturing the same, and a method for decorating the surface of the molded material using the same. More particularly, the present invention relates to a decorative sheet for decorating a surface of a three-dimensional molded material, a method for manufacturing the same, and a method for decorating the surface of the molded material using the same, in which molded materials having various shapes and the decorative sheet are formed in a vacuum, thereby improving processibility, adhesion, formability, and surface quality.

BACKGROUND ART

An insert molding or in-mold process has been used as a method for decorating surfaces of various molded materials.

Such methods are used to integrate heterogeneous or different-colored plastics, or other parts (e.g., metal, a cable, a printed circuit board, a magnet, etc.) within a mold. Conventionally, molding has been carried out by injecting a molding material into the mold after preparation of a decorative sheet. However, such methods can damage the surface of the decorative sheet due to high temperature upon injection of the molding material, and have a limit in expression of various three-dimensional textures.

To protect a print layer, a conventional decorative sheet has been manufactured by applying a hard coating composition to a prepared product and curing the composition with ultraviolet light. However, since the hard coating composition is applied by spraying, it entails environmental problems and a limit in expression of colors.

Therefore, there are needs for a decorative sheet for decorating a surface of a three-dimensional molded material, a method for manufacturing the same, and a method for decorating the surface of the molded material using the same, which can ensure improved adhesion and low defect rate for various shapes of the molded material.

DISCLOSURE

Technical Problem

One aspect of the present invention is to form both a decorative sheet and a molded material in a vacuum in order to decrease damage of the surface of the decorative sheet due to heat.

Another aspect of the present invention is to form both a decorative sheet and molded materials of various shapes in a vacuum in order to improve adhesion and formability.

A further aspect of the present invention is to increase productivity by simplifying a process using the decorative sheet.

Technical Solution

In accordance with one aspect, the present invention provides a method of manufacturing a decorative sheet for decorating a surface of a three-dimensional molded material, which includes: preparing a printed sheet, the printed layer including a base layer subjected to surface treatment after printing a pattern thereon, and a surface treatment layer laminated on a surface of the base layer; preparing an adhesive layer containing an adhesive and a release film layer by applying the adhesive onto a release film to be layered onto a back side of the adhesive layer, and laminating the printed sheet on a surface of the adhesive layer being bonded; and drying the adhesive layer laminated on a back side of the printed sheet to change the adhesive layer from a liquid state to a solid state by passing the printed sheet through a drying oven.

In accordance with another aspect, the present invention provides a decorative sheet for decorating a surface of a three-dimensional molded material, which includes: a printed sheet including a base layer subjected to surface treatment after printing a pattern thereon, and a surface treatment layer laminated on a surface of the base layer; an adhesive layer laminated on a back side of the printed sheet; and a release film layer laminated on a back side of the adhesive layer.

In accordance with a further aspect, the present invention provides a method of decorating a surface of a molded material using a decorative sheet, which includes: preparing a decorative sheet that includes a printed sheet including a base layer subjected to surface treatment after printing a pattern thereon, and a surface treatment layer laminated on a surface of the base layer, an adhesive layer laminated on a back side of the printed sheet, and a release film layer laminated on a back side of the adhesive layer, wherein an adhesive of the adhesive layer is applied onto the release film layer, and the adhesive of the adhesive layer is transferred to the back side of the printed sheet and solidified by drying a liquid component of the adhesive through a drying oven; removing the release film layer from the adhesive layer of the decorative sheet; and performing a vacuum molding process, with the back side of the decorative sheet, which has been removed of the release film layer, being disposed to face a surface of the molded material.

Advantageous Effects

The present invention has an effect of decreasing damage of the surface of the decorative sheet due to heat since both the decorative sheet and the molded material are simultaneously molded in a vacuum.

In addition, the present invention has an effect of improving adhesion and formability since both the decorative sheet and the molded material are simultaneously molded in a vacuum.

Further, the present invention has an effect of increasing productivity by simplifying a process using the decorative sheet.

Further, the present invention enables realization of a variety of textures and three-dimensional structures through vacuum deposition of the decorative sheet on molded materials having a variety of shape.

BEST MODE

Hereinafter, a decorative sheet for decorating a surface of a three-dimensional molded material, a method for manufacturing same, and a method for decorating the surface of the molded material using the same according to embodiments of the present invention will be described in detail with reference to the accompanying drawings.

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are given to provide complete disclosure and thorough understanding of the present invention to those skilled in the art. The scope of the present invention is defined only by the claims.

In addition, a detailed description of well-known techniques will be omitted for clarity of description.

Further, it should be noted that the drawings are not to precise scale and may be exaggerated in thickness of lines or size of components for descriptive convenience and clarity.

Furthermore, the terms used herein are defined by taking functions of the present invention into account and can be changed according to the custom or intention of users or operators.

Therefore, definition of the terms should be made according to the overall disclosures set forth herein.

Figure 1:
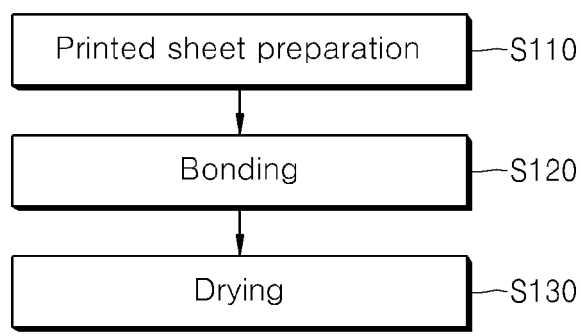
FIG. 1 is a flowchart of a method of manufacturing a decorative sheet for decorating a surface of a three-dimensional molded material according to one embodiment of the present invention.

FIG. 1 is a flowchart of a method of manufacturing a decorative sheet for decorating a surface of a three-dimensional molded material according to one embodiment of the present invention, Referring to FIG. 1, the method of manufacturing a decorative sheet for decorating a surface of a three-dimensional molded material according to the present invention includes a step of preparing a printed sheet including a base layer and a surface treatment layer (S110); a step of preparing an adhesive layer containing an adhesive and a release film layer laminated by applying the adhesive onto a release film to be layered onto a back side of the adhesive layer, and laminating the printed sheet on a surface of the adhesive layer being bonded (S120); and a step of drying the adhesive layer to change the adhesive layer from a liquid state to a solid state (S130).

Each step will be described hereinafter in detail with reference to the accompanying drawing.

Figure 2:
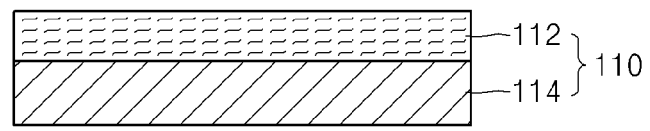
FIG. 2 is a sectional view showing a step of preparing a printed sheet according to one embodiment of the present invention.

FIG. 2 is a sectional view showing a step of preparing a printed sheet according to one embodiment of the present invention.

Referring to FIG. 2, regarding the step of preparing a printed sheet (S110 of FIG. 1), the printed sheet 110 includes a base layer 114 subjected to surface treatment after a pattern is printed thereon, and a surface treatment layer 112 laminated on the surface of the base layer 114.

The base layer 114 is comprised of one material selected from among polyvinyl chloride (PVC), polyethylene terephthalate glycol (PETG,), acrylonitrile butadiene styrene (ABS), and polymethyl methacrylate (PMMA).

These materials are excellent in terms of formability and impact resistance. In particular, PETG exhibits superior elongation upon heating to typical PET and thus can maximize formability when used in this invention.

In this way, in the method of manufacturing a decorative sheet according to the present invention, the step of preparing a printed sheet (S110 of FIG. 1) provides a printed sheet by forming the surface treatment layer 112 on the base layer 114 through surface treatment.

Figure 3:
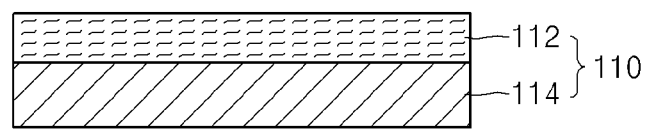
FIG. 3 is a sectional view showing a bonding step according to one embodiment of the present invention.
Figure 3:
Figure 3:
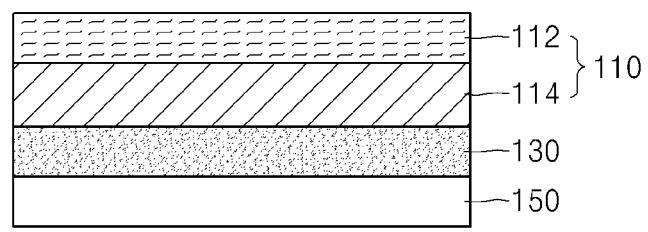

FIG. 3 is a sectional view showing the bonding step according to one embodiment of the present invention.

Referring to FIG. 3, the bonding step (S120 of FIG. 1) can be divided into (a) which shows the printed sheet 110 described in FIG. 2, (b) which shows an adhesive layer 130 and a release film layer 150 laminated thereon, and (c) which shows a combination of the components shown in (a) and (b).

(a), (b) and (c) will be described in more detail.

First, (a) shows the printed sheet 110 described in FIG. 2.

Second, (b) shows the adhesive layer 130 containing an adhesive and the release film layer 150 laminated on a back side of the adhesive layer 130 such that the adhesive of the adhesive layer is applied to a surface of the release film layer 150. The adhesive layer 130 may have a thickness (t) from 20 μm to 40 μm.

It is more advantageous to make the adhesive layer 130 thinner, however, if the thickness (t) of the adhesive layer 130 is less than 20 μm, it is difficult to guarantee a predetermined level of adhesion or more when the adhesive layer 130 is adhered to various three-dimensional adherends. On the other hand, if the thickness (t) of the adhesive layer 130 exceeds 40 μm, increase in amount of the adhesive can cause increase in hardness of a final product.

Therefore, the adhesive layer 130 may have a thickness (t) ranging from 20 μm to 40 μm.

The adhesive layer 130 may be comprised of one selected from among polyester, ethyl vinyl acetate (EVA), and urethane adhesives.

These adhesives for the adhesive layer 130 have flexibility and impact resistance, and are typically used for injection-molding products.

Third, (c) shows the step of boding the printed sheet 110 of (a) to the components of (b).

The base layer 114 of the printed sheet 110 shown in (a) is formed of one selected from among polyvinyl chloride (PVC), polyethylene terephthalate glycol (PETG), acrylonitrile butadiene styrene (ABS), and polymethyl methacrylate (PMMA).

Among these materials for the base layer 114, polyvinyl chloride (PVC) and polyethylene terephthalate glycol (PETG) may be adhered to the polyester adhesive of the adhesive layer 130.

In addition, among the materials for the base layer 114, ABS may be adhered to one selected from among polyester adhesive, ethyl vinyl acetate (EVA) adhesive and urethane adhesives.

As such, the adhesive composition may vary depending on the kind of base layer 114.

That is, the adhesive may be selected to secure adhesion depending on the kind of base layer 114.

Figure 4:
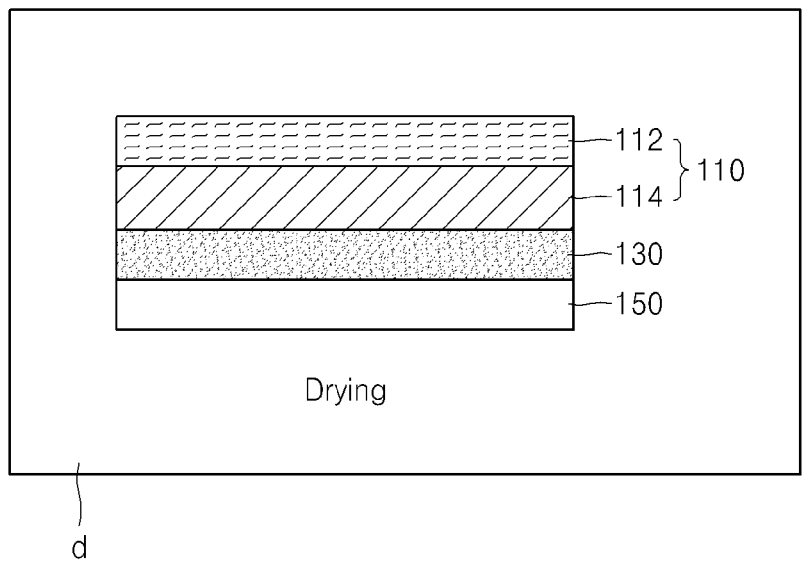
FIG. 4 is a sectional view showing a drying step according to one embodiment of the present invention.

FIG. 4 is a sectional view showing drying step according to one embodiment of the present invention.

Referring to FIG. 4, the drying step (S130 of FIG. 1) is carried out using a drying oven to dry the adhesive layer of the bonding step (S120 of FIG. 1) described with reference to FIG. 3.

As shown therein, the adhesive of the adhesive layer 130 laminated and coated on the surface of a release film layer 150 is transferred to the base layer 114 of the printed sheet 110.

That is, the adhesive layer 130 in a liquid state is dried and solidified through the drying oven d, and is thus more firmly adhered to the back side of the base layer 114.

The release film layer 150 must be released from the adhesive layer in the end. As shown in FIG. 3, since the adhesive layer 130 is coated on the release film layer 150, the adhesive layer 130 may not be easily adhered to the release film layer 150 without the drying step. That is, the drying step allows the adhesive layer 130 to be more firmly adhered to the base layer 114.

Here, the drying oven d may have a temperature of 50 to 180.

If the temperature of the drying oven d is less than 50, a solvent for the adhesive layer 130 cannot be sufficiently dried, such that the adhesive is not easily transferred to the base layer 114, thereby causing deterioration of adhesion. On the other hand, if the temperature of the drying oven d exceeds 180, heat resistance is lowered while causing problems in final products.

Figure 5:
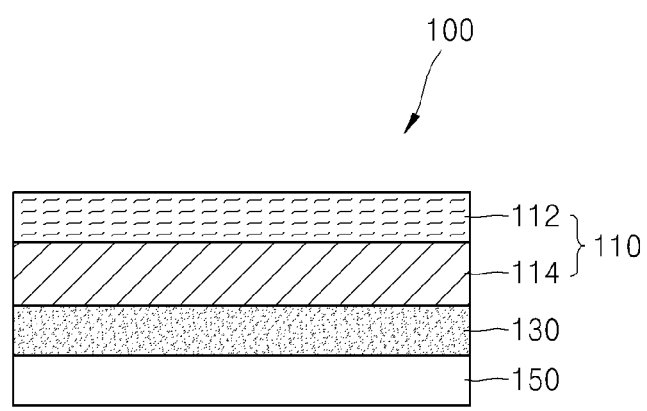
FIG. 5 is a sectional view of a decorative sheet according to one embodiment of the present invention.

FIG. 5 is a sectional view of a decorative sheet according to one embodiment of the present invention, Referring to FIG. 5, a decorative sheet 100 is manufactured through the steps shown in FIGS. 1 to 4.

The decorative sheet 100 includes a printed sheet 110, which includes a base layer 114 subjected to surface treatment after printing a pattern thereon and a surface treatment layer 112 laminated on a surface of the base layer 114, an adhesive layer 130 laminated on a back side of the printed sheet 110, and a release film layer 150 laminated on a back side of the adhesive layer 130.

The decorative sheet 100 is the same as that described with reference to FIGS. 1 to 4, and a description thereof will be omitted.

Figure 6:
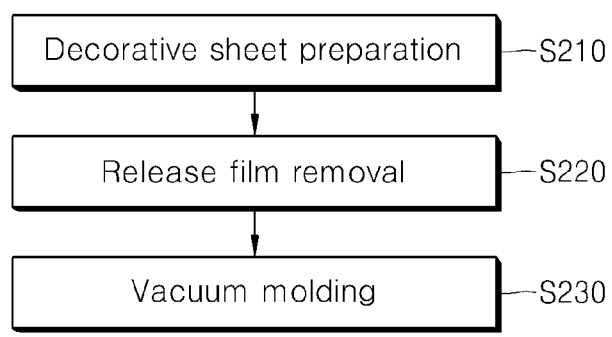
FIG. 6 is a flowchart of a method of decorating a surface of a molded material using a decorative sheet according to one embodiment of the present invention.

FIG. 6 is a flowchart of a method of decorating a surface of a molded material using a decorative sheet according to one embodiment of the present invention.

Referring to FIG. 6, the method includes a decorative sheet preparation step 210 of preparing a decorative sheet that includes a printed sheet including a base layer subjected to surface treatment after printing a pattern thereon, and a surface treatment layer laminated on a surface of the base layer, an adhesive layer laminated on a back side of the printed sheet, and a release film layer laminated on a back side of the adhesive layer, wherein an adhesive of the adhesive layer is applied onto the release film layer, and the adhesive of the adhesive layer is transferred to the back side of the printed sheet and solidified by drying a liquid component of the adhesive in a drying oven; a release film layer removal step S220 of removing the release film layer from the adhesive layer of the decorative sheet; and a vacuum molding step S230 of performing a vacuum molding process, with the back side of the decorative sheet, which has been removed of the release film layer, being disposed to face a surface of the molded material.

The decorative sheet preparation step S210 has been described with reference to FIGS. 1 to 5, and descriptions thereof will be omitted.

Each step will be described in detail with reference to the accompanying drawings.

Figure 7:
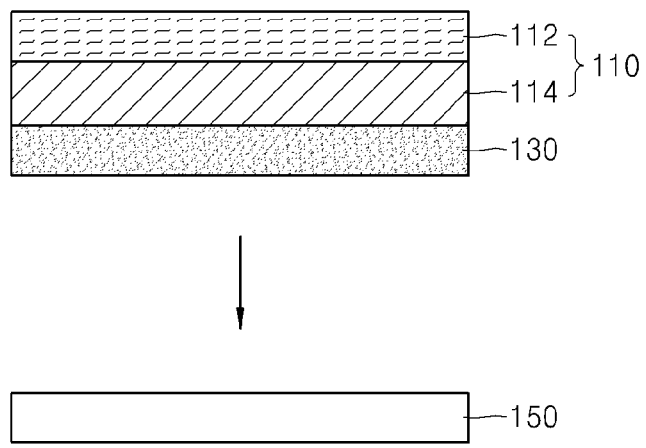
FIG. 7 is a sectional view showing a step of removing a release film layer according to one embodiment of the present invention.

FIG. 7 is a sectional view showing the step of removing a release film layer according to one embodiment of the present invention.

Referring to FIG. 7, the release film layer removal step (S220 of FIG. 6) is a process before the vacuum molding step (S230 of FIG. 6) with respect to the prepared decorative sheet (100 of FIG. 5) and a molded material having various shapes.

To bond the decorative sheet (100 of FIG. 5) to a molded material, it is necessary to remove the release film layer 150.

Figure 8:
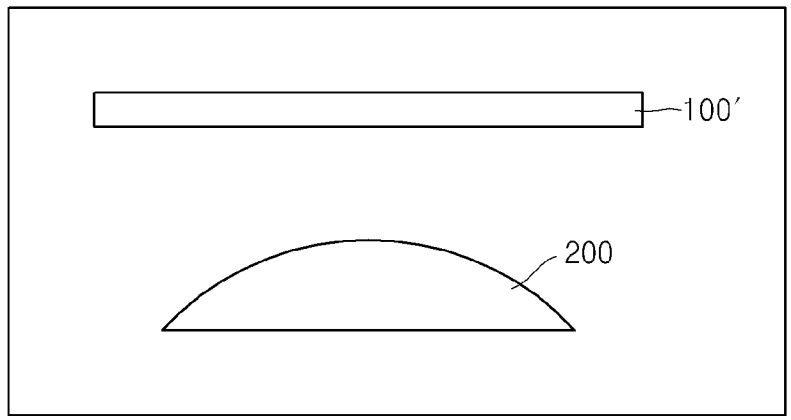
FIGS. 8 and 9 are sectional views showing a vacuum molding step according to one embodiment of the present invention.
Figure 9:
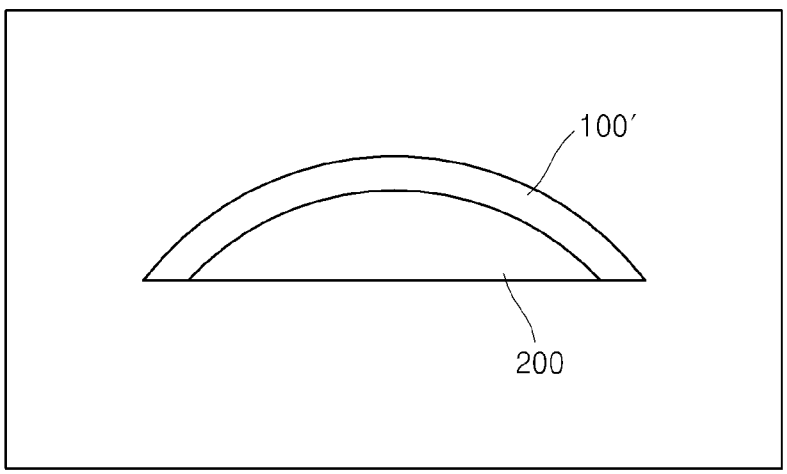

FIGS. 8 and 9 are sectional views showing vacuum molding step according to one embodiment of the present invention.

First, FIG. 8 shows a process wherein a decorative sheet 100', from which the release film layer (150 of FIG. 7) has been removed as shown in FIG. 7, is prepared through a vacuum molding machine together with a curved molded material 200.

The decorative sheet 100', from which the release film layer (150 of FIG. 7) has been removed, and the molded material 200 are molded in a vacuum, as shown in FIG. 9, such that they can be adhered to each other at a suitable temperature and pressure.

The vacuum molding step (230 of FIG. 6) is performed at a temperature of 80 to 120.

If the vacuum molding temperature is less than 80, adhesion and formability are insufficient, thereby causing defects of a final product. If the vacuum molding temperature is higher than 120, the decorative sheet 100' can be damaged.

As a result, the vacuum molding step (230 of FIG. 6) is advantageously performed at a temperature of 80 to 120.

Accordingly, the present invention enables simultaneous formation of the decorative sheet and the molded material in a vacuum, thereby providing an effect of preventing the surface of the decorative sheet from being damaged due to heat.

In addition, the present invention enables simultaneous formation of the decorative sheet and molded materials of various shapes in a vacuum, thereby improving adhesion and formability.

Further, the present invention enables simplification of a process of forming the decorative sheet, thereby increasing productivity.

Further, the present invention enables realization of a variety of textures and three-dimensional structures through vacuum deposition of the decorative sheet on molded materials having a variety of shape Although some embodiments have been described above, it will be understood by those skilled in the art that these embodiments are provided for illustration only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. A method for decorating a surface of a molded material using a decorative sheet, comprising:

preparing a decorative sheet that includes a printed sheet including a base layer disposed on a back side of the printed sheet and subjected to surface treatment after printing a pattern thereon, and a surface treatment layer laminated on a surface of the base layer, an adhesive layer laminated on a back side of the printed sheet, and a release film layer laminated on a back side of the adhesive layer, wherein an adhesive of the adhesive layer is applied onto the release film layer, and the adhesive of the adhesive layer is transferred to the back side of the printed sheet and solidified by drying a liquid component of the adhesive through a drying oven;

removing the release film layer from the adhesive layer of the decorative sheet; and performing a vacuum molding process, with the back side of the decorative sheet, which has been removed of the release film layer, being disposed to face a surface of the molded material, wherein the pattern is printed on a top surface of the base layer, wherein the drying oven is maintained at a temperature of 50° C. to 180° C., and wherein the vacuum molding process is performed at a temperature of 80° C. to 120° C.

2. The method according to claim 1, wherein the adhesive layer is formed to have a thickness of 20 μm to 40 μm.

3. The method according to claim 1, wherein the base layer comprises polyethylene terephthalate glycol (PETG).

4. The method according to claim 3, wherein the base layer further comprises polyvinyl chloride (PVC), acrylonitrile butadiene styrene (ABS), or polymethyl methacrylate (PMMA).

* * * * *